United States Patent [19]

Sandelli et al.

[11] Patent Number: 4,643,956
[45] Date of Patent: Feb. 17, 1987

[54] COKE FILLED SEPARATOR PLATE FOR ELECTROCHEMICAL CELLS

[75] Inventors: Gregory J. Sandelli, Newington; William A. Taylor, Glastonbury, both of Conn.

[73] Assignee: United Technologies Corporation, Hartford, Conn.

[21] Appl. No.: 686,063

[22] Filed: Dec. 24, 1984

[51] Int. Cl.$^4$ .............................................. H01M 2/16
[52] U.S. Cl. .................................... 429/34; 429/247; 429/249; 429/253
[58] Field of Search ................. 429/251, 253, 34, 247, 429/249; 264/29.5, 29.7, 105, 236; 423/499; 260/38

[56] References Cited

U.S. PATENT DOCUMENTS

| | | | |
|---|---|---|---|
| 3,391,103 | 7/1968 | Mueller | 260/38 |
| 3,968,075 | 7/1976 | Doucette et al. | 260/42.25 |
| 4,301,222 | 11/1981 | Emanuelson et al. | 429/251 |
| 4,360,485 | 11/1982 | Emanuelson et al. | 264/29.5 |

FOREIGN PATENT DOCUMENTS 1240793 7/1971 Fed. Rep. of Germany .
551347 2/1974 U.S.S.R. .

OTHER PUBLICATIONS

Chemical Abstracts 87:6912s (vol. 87, 1977).
Chemical Abstract 87:27667F (vol. 87, 1977).

*Primary Examiner*—Anthony Skapars
*Attorney, Agent, or Firm*—A. Dean Olson; E. Richard Skula

[57] ABSTRACT

An electrochemical cell separator plate formed from a mixture of carbonizable resin and coke particles, wherein the plate is molded from the resin and coke particles, carbonized, and graphitized. The particle size distribution of the coke is selected so that expansion occurring during graphitization minimizes the rupture of carbonized bonds within the separator plate. The separator plates have improved properties over separator plates formed from graphite particles including increased density, decreased porosity and increased corrosion resistance. The coke particle plates are more energy efficient to manufacture than graphite particle plates.

9 Claims, No Drawings

COKE FILLED SEPARATOR PLATE FOR ELECTROCHEMICAL CELLS

DESCRIPTION

1. Technical Field

The field of art to which this invention pertains is molded articles produced from carbonizable material, particularly adapted for use in electrochemical cells.

2. Background Art

Graphitized electrochemical separator plates for use in fuel cells are well known in the fuel cell industry. A typical fuel cell comprises a plurality of individual cells, each cell comprising an anode, a cathode and an electrolyte. The fuel cells are typically stacked together to produce a unit with the desired electrical operating characteristics. The cells are separated from each other by separator plates.

Typically, separator plates are thin, molded structures formed from a composite of graphite and phenol-formaldehyde resin. It is critical to select a resin which is carbonizable. After the plate has been molded, the plate is heat treated to carbonize the resin, and then further heat treated to graphitize the molded plate. These graphitized separator plates are particularly useful in fuel cells wherein the electrolyte is phosphoric acid and corrosion resistant separator plates are required.

The components of a phosphoric acid fuel cell, in which the reactants are hydrogen and oxygen, are subjected to severe operating conditions and require certain physical, chemical, and electrical characteristics in order to perform adequately and provide the fuel cell with a reasonably long life expectancy. The plate should be thin and should have a low permeability, especially to hydrogen gas. The plate should have high thermal conductivity and low thru-plane and in-plane electrical resistance. The plate should have high corrosion resistance as indicated by threshold corrosion potential and resistance to oxidation. The plate should have high structural integrity, in particular, flexural strength. Flexural strength is related to the longevity of a separator plate in an operational fuel cell.

Graphitized separator plates manufactured from carbonizable resin and graphite particles for use in electrochemical cells are known in the art, see U.S. Pat. No. 4,301,222, and have been successfully used as fuel cell separator plates. Methods of manufacturing graphitized electrochemical cell separator plates from carbonizable resin and graphite particles for use in fuel cells are similarly known in the art, see U.S. Pat. No. 4,360,485. The disclosure of U.S. Pat. Nos. 4,301,222 and 4,360,485 are incorporated by reference. Although the electrochemical cell separator plates of the prior art produced from graphite performed well, there is always a constant search for plates with improved properties. For example, it is advantageous to have separator plates with improved thermal conductivity to increase the rate at which heat is removed from a fuel cell. It is also advantageous to have an electrochemical cell separator plate with increased retention of flexural strength as a result of improved corrosion resistance in order to prolong the life of the separator plates and fuel cell. In addition, separator plates having decreased electrical resistivity resulting from higher density would increase the efficiency of a fuel cell. Electrochemical separator plates having increased corrosion resistance due to the use of materials of construction having lower levels of impurities would prolong the useful life of fuel cells. Electrochemical separator plates having increased density and decreased porosity are desirable. Electrochemical separator plates manufactured from low cost components and with a lower expenditure of energy during the overall manufacturing process are similarly advantageous.

Accordingly, what is needed in this art are improved separator plates having increased density, decreased porosity, increased thermal conductivity, decreased electrical resistivity, improved corrosion resistance, and which are less costly to manufacture.

DISCLOSURE OF INVENTION

It has now been found that electrochemical cell separator plates comprising the molded, carbonized and graphitized product formed from a composition comprising about 30 wt. % to about 60 wt. % of coke particles and about 30 wt. % to about 60 wt. % of carbonizable resin have advantages over conventional plates manufactured from graphite particles. The molded plates are carbonized and then graphitized resulting in graphitized separator plates having increased density, decreased porosity, and increased corrosion resistance over conventional separator plates formed from graphite particles.

Another aspect of this invention is a fuel cell of the type comprising a plurality of cells, each cell comprising an anode, a cathode, an electrode and separator plates, wherein the fuel cell incorporates improved carbonized and graphitized separator plates formed from a composition comprising about 30 wt. % to about 60 wt. % of coke particles, and about 30 wt. % to about 60 wt. % of carbonizable resin. The separator plates have increased density, decreased porosity, and increased corrosion resistance over separator plates formed from graphite particles.

Another aspect of this invention is a method of manufacturing electrochemical cell separator plates wherein the plate is molded at sufficient heat and pressure to densify the plate, the plate is then heated at a sufficient temperature to carbonize the resin in the molded plate, and then the plate is heated to graphitize the entire plate, wherein an improved plate is produced by using as the molding composition a mixture comprising about 30 wt.% to about 60 wt.% of coke particles and about 30 wt.% to about 60 wt.% of carbonizable resin. The separator plates produced by this method have increased density, decreased porosity, and increased corrosion resistance over separator plates formed from graphite particles.

The foregoing, and other features and advantages of the present invention will become more apparent from the following description.

DESCRIPTION OF PREFERRED EMBODIMENTS

The coke used in the practice of this invention will preferably be petroleum coke. It is particularly preferred to use high purity petroleum coke. Petroleum coke is typically made by heating petroleum pitch and then calcining the pitch to produce a thermal degradation or decomposition of the hydrocarbons in the pitch to produce what is known as coke. The coke is then granulated and is typically purchased as a powder. The coke useful in the practice of this invention will typically have a sufficient particle size distribution such that minimal fracture of carbonized resin bonds occurs for a given separator plate thickness. The particle size is directly related to the size of the component to be molded. The coke useful in the practice of this invention will typically have a particle size distribution wherein about 2% to about 10% of the coke particles are about 74 microns to about 149 microns, about 17% to about 35% of the coke particles are about 44 microns to about 74 microns, and at least about 55% to about 80% of the coke particles are less than about 44 microns. It is preferred that at least about 55% of the coke particles are less than about 44 microns and that 100% of the coke particles are less than 150 microns. The coke particles will have an aspect ratio sufficient to produce a graphitized separator plate having sufficient flexural strength and structural characteristics. Aspect ratio is defined as the ratio of the difference between the length and width of a particle divided by the length of that particle. Typically the aspect ratio will be less than about 0.5 and preferably about 0.35.

It is optional to use prepuffed coke in the practice of this invention. Normally when the molded coke resin composite is graphitized, the coke particles tend to increase in volume i.e., tend to "puff". This can create problems such as stress cracks and the breaking of the coke resin bonds in the graphitized plate. Prepuffing is defined as a process wherein the coke particles are exposed to sufficient heat to pre-expand the particles prior to molding. Prepuffing of coke is an extra step in the manufacturing process requiring significant energy input. It should be noted, however, that if the correct particle size is chosen, surprisingly and unexpectedly puffing is not a problem and no significant fracture of carbonized resin bonds is observed to occur during graphitization. It is critical in the practice of this invention to ascertain the correct coke particle size for a given thickness of molded object in order to use coke which has not been prepuffed. The use of coke particles which have not been prepuffed yields separator plates having a higher density than graphite plates. The coke particle size distribution is similarly determined in accordance with the component to be molded. The petroleum coke which can be used in the practice of this invention includes Airco Grade 90 petroleum coke manufactured by Airco Carbon Company, Saint Mary's, Pa. and Asbury CF70-W coke manufactured by Asbury Graphite Mills, Asbury, N.J. The coke is preferably of high purity, for example, a precursor of a high or intermediate purity graphite.

The resins which can be used in the practice in this invention include the thermosetting phenol-formaidehyde resins, both novolacs and resols. It is critical that the resin selected be capable of virtually complete carbonization. While thermosetting phenolic resins are preferred, it is possible to use other resinous materials such as coal tar or petroleum pitch resins, furfural resins, etc. Phenol-formaldehyde resins are well known in the art and are typically manufactured by reacting phenol with aqueous formaldehyde in the presence of a basic catalyst. When the process is varied and an acid catalyst is used, a novalac resin is produced. A resin which may be used in the practice of this invention is Reichhold Chemical Company (Niagara Falls, N.Y.) grade 24-655 phenolic resin or grade 29-810 phenolic resin. Other resins that can be used to manufacture the separator plates of this invention include Plastics Engineering Company brand phenolic resin number 1339 and phenolic resin number 1442 manufactured by Plastics Engineering Company, Sheboygan, Wis.

Other additives conventionally used in the art for compression molding phenolic resins may be used to manufacture the electrochemical plates of this invention. For example, sufficient amounts of lubricants, mold release agents, etc. may be included in the molding compositions of this invention to improve the molding process parameters.

To manufacture the separator plates of this invention, initially the dry coke is mixed with the dry powdered phenolic resin for a sufficient period of time to achieve a uniform mix. Any dry mixing process can be utilized to accomplish the mixing of the components. Typically the components are mixed for about three to about five minutes, more typically about three minutes to about four minutes, and preferably about three minutes to about three and one-half minutes to achieve a homogeneous mixture in a mixing means such as a Littleford blender, manufactured by Littleford Company, Covington, Ky. or a Nauta blender manufactured by J. H. Day Company in Ohio. It is desirable, although not necessary, to further compound the dry molding mixture to obtain sufficient homogeneity and sufficient consistency in the molded plate. This is typically done by hot milling and pelletizing using processes and equipment conventional and known in the art for producing phenolic molding compounds. Whether or not further compounding is required depends upon the particular characteristics of the resin selected. Compounding and hot milling of phenolic molding compounds is disclosed in *Polymer Chemistry: An Introduction*, Seymour, R. V., and Carraher, Jr., C., P.225, Marcel Dekker, Inc., New York, 1981.

The molding composition is then molded in conventional compression molding equipment with sufficient heat and pressure and for a sufficient time period to provide a molded plate with a density of about 1.58 grams/cc to about 1.62 grams/cc, more typically about 1.58 grams/cc to about 1.60 grams/cc, and preferably about 1.59 grams/cc to about 1.60 grams/cc. The plates are typically molded at a temperature of about 250° F. to about 350° F., more typically about 275° F. to about 350° F., and preferably about 300° F. to about 350° F., at a pressure typically about 500 psig. to about 1,500 psig., and preferably about 600 psig. to about 1,500 psig. for a time period of about 2 minutes to about 10 minutes, more typically about 2 minutes to about 6 minutes, and preferably about 2 minutes to about 5 minutes. Typical of the compression molding presses used in the practice of this art is a Williams White 1500 ton compression molding press manufactured by Williams White Company, located in Moline, Ill. 61265.

The molded plates are then surface ground, if necessary, to achieve a uniform thickness. Surface grinding is done with grinding equipment conventional in the art. Coarse and fine (about 180 grit) grinding media should be used to minimize blinding of the grinding media. It is important that the plate be molded to the most uniform thickness economically feasible to minimize or eliminate surface grinding.

Once the plates have been ground to the size required, the next step in the process is the carbonization of the phenolic resin. That is, the phenolic resin must be converted to carbon by controlled decomposition of the carbon hydrogen bonds in the resin. The carbonization process is accomplished in a conventional gas fired convection oven with a retort and computerized controls. The plates are typically stacked in the oven in such a manner that the plates are restrained to maintain flatness, the retort is then purged with nitrogen or an inert gas, and the plates are exposed to a controlled heat-up cycle wherein the temperatures are typically about 1,200° F. to about 2,000° F., more typically about 1,200° F. to about 1,850° F., and preferably about 1850° F. for a sufficient amount of time to achieve carbonization without adversely affecting the plate characteristics by permitting the gaseous by-products of the carbonization process to slowly be removed from the plate interior. The preferred cycle time is about 100 hours to about 200 hours.

Once the plates have been carbonized, the next step is the graphitization process. The plates are graphitized at temperatures of about 2,100° C. to about 3,000° C., more typically about 2,200° C. to about 3,000° C., and preferably about 2,650° C. to about 2,850° C. The graphitization process is an electrical heating process in which the plates are connected to a current source, and, sufficient current is passed through the resistive load to produce the graphitization temperatures. The process used is the Acheson process in which a standard graphitization cycle, known in the art, is used to graphitize the plate. The finished plates have a nominal thickness of about 0.025 inch to about 0.036 inch, more typically about 0.028 inch to about 0.033 inch, and preferably about 0.030 inch. The molded plate, prior to carbonization and graphitization, is approximately 15% oversized to compensate for shrinkage during the carbonization and graphitization processes. The electrochemical separator plates of this invention typically can have a nominal size of up to about 16 square feet, although, nominal sizes of about 5"×5" to about 24"×27" are particularly useful.

The separator plates of this invention have higher densities than the graphite particle plates of the prior art and exhibit improved properties. Due to the significant quantities of heat generated during the operation of a typical fuel cell it is important that the cell have high thermal conductivity. Thermal conductivity is defined as the rate of heat conduction per unit area degree fahrenheit. The separator plates of the present invention have thermal conductivities of about 40 BTU/hr ft$^{2°}$ F. to about 120 BTU/hr ft$^{2°}$ F., more typically about 40 BTU/hr ft$^{2°}$ F. to about 70 BTU/hr ft$^{2°}$ F. Preferably, the thermal conductivity is at least about 40 BTU/hr ft$^{2°}$ F.

The separator plates of the present invention will typically have an in-plane electrical resistivity less than about $1 \times 10^{-2}$ ohm-cm, more typically less than about $0.5 \times 10^{-2}$ ohm-cm, and preferably less than about $0.25 \times 10^{-2}$ ohm-cm. The plates of the present invention will typically have a thru-plane resistivity of less than about $2 \times 10^{-2}$ ohm-cm, more typically less than about $0.75 \times 10^{-2}$ ohm-cm, and preferably less than about $0.4 \times 10^{-2}$ ohm-cm.

The plates of the present invention will have sufficient structural integrity to withstand typical fuel cell operation of about 40,000 hours at a temperature of about 400° F. The primary parameter which is a good indicator of the structural longevity of a separator plate is the retention of flexural strength as a result of good corrosion resistance. Flexural strength is defined as the upper limit of plate bending without cracking. The plates of the present invention have initial flexural strengths of typically about 4,000 psi to about 9,000 psi, and more typically about 5,000 psi to about 7,000 psi.

As previously mentioned, it is important to have separator plates with high initial flexural strength and good corrosion resistance thereby enabling the plate to retain its structural strength and improve longevity during operation. The separator plates of the present invention have increased resistance to corrosion and to oxidation. Corrosion resistance can be predicted by measuring the threshold corrosion potential. The threshold corrosion potential is the electrochemical potential at which there is a breakdown of the carbon in a plate, to form carbon monoxide and carbon dioxide indicated by a rapid increase in the magnitude of current. The magnitude of the threshold corrosion potential is related to the purity of the components used to manufacture the plate as well as the degree of graphitization. Typically, the threshold corrosion potential of the plates of this invention will be about 1,150 millivolts to about 1,210 millivolts, more typically about 1,165 millivolts to about 1,200 millivolts and generally about 1,190 millivolts to about 1,200 millivolts.

Another indication of corrosion resistance is the open porosity of the plate. The open porosity will typically be about 4% to about 6% for pores greater than 0.004 micron. Open porosity refers to surface pores in the plate. Open porosity is measured by mercury intrusion porosimetry using a conventional porosimeter.

It is believed that the use of coke in separator plates rather than graphite particles results in a decrease in the residual impurities in the graphitized plate. It is thought that impurities are inherent in graphite powder because of the additional processing done by the manufacturer. The reduction or elimination of the impurities by using coke particles improves the corrosion resistance.

The graphitized electrochemical plates of this invention will typically have a density of about 1.88 g/cc to about 1.94 g/cc, more typically about 1.88 g/cc to about 1.92 g/cc, and typically greater than about 1.88 g/cc. It should be noted that increased density results in a plate with decreased wetted area. Wetted area is related to corrosion threshold. Increased density and resulting decreased wetted area result in lower measured corrosion current at the same current density. It should be noted that oxidation and corrosion rates are generally related to increased active or wetted area of the plate as well as impurities in the plate.

It is contemplated that the separator plates of this invention will have multiple uses in addition to use as separator plates in fuel cells. The plates can be used as battery separators, the plates can also be used as ionic membrane cell separators, or the plates can be used in any system or chemical process requiring a separating barrier constructed of an inert conductive material.

The following example is illustrative of the principles of practice of this invention although not limited thereto. Parts and percentages where used are parts and percentages by weight.

EXAMPLE

An electrochemical plate was made by initially mixing 50 wt. % of coke particles with 50 wt. % of phenolic resin until a homogeneous mixture was produced. The coke was Asbury CF70W petroleum coke manufactured by Asbury Graphite Mills, Asbury, N.J. The coke particles had an average aspect ratio of less than 0.4; the particles had a particle size distribution such that 80% of the particles were less than 44 microns in size and 100% of the particles were less than 150 microns in size. The resin used was powdered Reichhold Grade 24-655 phenolic resin manufactured by Reichhold Chemical Company, Niagara Falls, N.Y. The coke and resin were mixed for about five minutes in a Littleford brand mixer.

The molding mixture was then molded into a separator plate having a length of about 6 inches, a width of about 6 inches and a thickness of about 0.05 inch. The plate was molded in a 50 ton laboratory compression molding press manufactured by Baldwin-Defiance, Inc., Broomal, Pa. 16008 at a temperature of about 300° F., a pressure of about 5,000 psig. for about 3 minutes.

The molded plate was then packed in a Lindberg brand electric convection oven with a retort manufactured by Sola-Basic Industries, Chicago, Il. The plate was carbonized by purging the retort with nitrogen and slowly heating to about 1850° F. in a conventional controlled heating carbonization cycle with a cycle time of about 160 hours.

The plate was next graphitized using a conventional Acheson Graphitization Process by placing the plate in a conventional Acheson graphitization furnace and passing a sufficient current through the plate until a temperature of 2,650° C. was reached. The plate was held at this temperature for at least one hour.

The graphitized plate had a length of 5 inches, a width of 5 inches and a thickness of 0.040 inch.

A comparison of the plate characteristics of the coke particle plates with the graphite particle plates of U.S. Pat. No. 4,301,222 is presented in Table I.

TABLE I

|  | Graphite Particle Plate | Coke Particle Plate |
|---|---|---|
| Density | 1.88 g/cc | 1.93 g/cc |
| % Open Porosity | 8.7% | 5.6% |
| Flexural Strength | 6,773 psi | 8,780 psi |
| Electrical Resistivity |  |  |
| In-plane | $1.7 \times 10^{-3}$ ohm-cm | $2.4 \times 10^{-3}$ ohm-cm |
| Thru-plane | $8.76 \times 10^{-3}$ ohm-cm | $7.2 \times 10^{-3}$ ohm-cm |
| Thermal Conductivity In-plane | 59 BTU/hr ft °F. | 38 BTU/hr ft °F. |
| Corrosion Threshold | 1,140 mv | 1,165 mv |

A test of corrosion resistance was conducted by immersing the plate in 105% phosphoric acid maintained at a temperature of 400° F. for 5,000 hours and maintaining a 950 mv potential on the plate. The corrosion test results are present in Table II.

TABLE II

|  | Coke Particle Plate |
|---|---|
| Corrosion Threshold |  |
| Initial | 1,165 mv |
| Final | 1,135 mv |
| Flexural Strength |  |
| Initial | 8,780 psi |
| Final | 8,715 psi |
| Weight Change | +0.85% |

The coke particle separator plates of the present invention have surprising and unexpected improved properties over the graphite particle separator plates of the prior art. The plates of the present invention have a higher density, and decreased open plate porosity. The plates have increased corrosion resistance as shown by improved corrosion threshold potential and increased resistance to oxidation. It is expected that, overall, the electrical resistivity and the thermal conductivity of coke particle plates will be improved over graphite particle plates due to the increased density of the coke particle plates.

It should be noted that coke particle separator plates are more economical to manufacture since coke typically has a cost below that of graphite due to the high energy input required to manufacture graphite.

The process of the present invention is energy efficient since the coke is converted to graphite during the separator plate graphitization process. The graphite particle plates of the prior art must still be graphitized resulting in a wasted expenditure of energy required to bring the graphite particles up to the graphitizing temperature. A person skilled in the art would realize that the overall manufacturing process is more energy efficient when coke particles are used in the separator plates versus graphite particles.

Although this invention has been shown and described with respect to detailed embodiments thereof, it will be understood by those skilled in the art that various changes in form and detail thereof may be made without departing from the spirit and scope of the claimed invention.

We claim:

1. An electrochemical cell separator plate comprising the molded, carbonized and graphitized product formed from a composition comprising:
   about 30 weight % to about 60 weight % of coke particles;
   said coke particles having a size less than 150 microns; and
   about 30 weight % to about 60 weight % of carbonizable resin;
wherein the separator plate has increased density, decreased open porosity and increased corrosion resistance over separator plate formed from graphite particles.

2. The separator plate of claim 1 wherein the coke has a particle size distribution such that about 55% to about 80% of the coke particles are less than about 44 microns in size.

3. The separator plate of claim 2 wherein the resin is a carbonizable phenolic resin selected from the group consisting of phenol-formaldehyde resols and phenol-formaldehyde novolacs.

4. A fuel cell comprising at least one anode, at least one cathode, electrolyte material and at least one separator plate, wherein the improvement comprises as the separator plate a carbonized and graphitized separtor plate formed from a composition comprising:
   about 30 weight % to about 60 weight % coke particles;
   said coke particles having a size less than 150 microns; and
   about 30 weight % to about 60 weight % carbonizable resin
the separator plate having increased density, decreased open porosity and increased corrosion resistance over separator plates formed from graphite particles.

5. The fuel cell of claim 4 wherein the coke has a particle size distribution such that about 55% to about 80% of the coke particles are less than about 44 microns in size.

6. The fuel cell of claim 4 wherein the resin is a carbonizable phenolic resin selected from the group consisting of phenol-formaldehyde novlacs.

7. An electrochemical cell separator plate produced from a carbonizable and graphitizable molding composition by molding at sufficient heat and pressure to densify the plate, and then heating at a sufficient temperature to carbonize and then graphitize the plate, wherein the improvement comprises using as the molding composition a mixture comprising:

about 30 weight % to about 60 weight % of coke particles, said coke particles having a size less than 150 microns; and about 30 weight % to about 60 weight % of carbonizable resin wherein the carbonized plate has increased density, decreased open porosity, and increased corrosion resistance over separator plates formed from graphite particles.

8. The electrochemical cell separator plate of claim 5 wherein the resin is a carbonizable phenolic resin selected from the group consisting of phenol-formaldehyde resols and phenol-formaldehyde novalacs.

9. An electrochemical cell separator plate of claim 5 wherein the coke has a particle size distribution such that about 55% to about 80% of the coke particles are less than about 44 microns in size.

* * * * *